United States Patent [19]

Boioli et al.

[11] Patent Number: 5,218,690

[45] Date of Patent: Jun. 8, 1993

[54] VME-MULTIBUS II INTERFACE ADAPTER FOR PROTOCOL CONVERSION AND FOR MONITORING AND DISCRIMINATING ACCESSES ON THE MULTIBUS II SYSTEM BUS

[75] Inventors: Roberto Boioli, Busto Garolfo; Carlo Munero, Cornaredo; Lucio Savogin, Como, all of Italy

[73] Assignee: Bull HN Information Systems Inc., Billerica, Mass.

[21] Appl. No.: 521,854

[22] Filed: May 10, 1990

[30] Foreign Application Priority Data

Jun. 8, 1989 [IT] Italy ................ 20813 A/89

[51] Int. Cl.$^5$ ................ G06F 13/14; G06F 13/36; G06F 11/30

[52] U.S. Cl. .................... 395/500; 395/325; 364/238.5; 364/239; 364/239.3; 364/DIG. 1; 364/927.94

[58] Field of Search ................ 395/500, 325

[56] References Cited

U.S. PATENT DOCUMENTS

| | | | |
|---|---|---|---|
| 4,935,868 | 6/1990 | DuLac | 395/325 |
| 4,935,894 | 6/1990 | Ternes et al. | 395/325 |
| 5,083,259 | 1/1992 | Maresh et al. | 395/325 |

FOREIGN PATENT DOCUMENTS 0263276 8/1987 European Pat. Off. .
0260392 3/1988 European Pat. Off. .

OTHER PUBLICATIONS

Wright; "Bus-Interface ICs", EDN; May 26, 1988; pp. 123-136.
"Multibus II-VME Interface"-Moreno Coli et al--Computer Standards & Interfaces (1989)-Amsterdam, NL-pp. 179-188.

Primary Examiner—Thomas C. Lee
Assistant Examiner—Paul Harrity
Attorney, Agent, or Firm—J. H. Phillips; J. S. Solakian

[57] ABSTRACT

Interface adapter VME bus—MULTIBUS II (PSB bus) consisting of a printed circuit board comprising logic circuits for converting VME interface signals to PSB interface signals and vice versa, provided with connectors for connection to a standard VME board on one edge and to a PSB bus on the opposite edge and having a size such that when coupled to a VME standard board the size of the two coupled boards is equal to the size of a standard PSB board and can be inserted in a housing sized for a standard PSB.

2 Claims, 3 Drawing Sheets

VME-MULTIBUS II INTERFACE ADAPTER FOR PROTOCOL CONVERSION AND FOR MONITORING AND DISCRIMINATING ACCESSES ON THE MULTIBUS II SYSTEM BUS

BACKGROUND OF THE INVENTION

1. Field of Use

The present invention relates generally to data processing systems and more precisely to multiprocessor systems which use standard system busses for interprocessor communication.

2. Prior Art

In modern data processing systems, the trend is well developed of using communication busses and components (memory units, processors, peripheral unit controllers, all implemented as printed circuit boards) of standard type. This is advisable in order to limit the design and development activity to specific components and integrating the system architecture with a plurality of components already available on the market, so as to make readily available to customers products which are flexible and suitable to the several user needs with a limited incidence of development costs on the product costs.

Electronic components implemented in a single printed circuit board (PCB) and interfacing with either one or the other of two standard system busses are wide spread in the market.

A first standard bus is known by the name VME bus and is defined by specifications published in 1982.

A second standard bus is known by the name MULTIBUS II or PSB, in the following referenced as PSB, and is defined by specifications published in 1987 by IEEE with code P1296 PSB Standard.

The two busses differ in several respects.

The VME bus is of asynchronous type, and has distinct channels for data and addresses.

The PSB bus is of synchronous type, with a single channel which is used for transferring both addresses and data in different time phases. The communication protocols are quite different and the PSB bus offers direct interprocessor communication capability which is not provided by the VME bus. Therefore, it is particularly suitable as system bus for a multiprocessor system where a plurality of central processing units (CPU's) share the tasks.

The VME bus is more suitable in system where a plurality of I/O processors or peripheral unit controllers have to communicate with a single central processing unit (in case of a plurality of CPUs, the several CPUs must communicate each with the other in an indirect way, through "mailboxing" procedures).

For these reasons a multiplicity of standard boards is available on the market, which boards have an interface for connection to the VME bus and perform the function of controllers for peripheral units of many various kinds.

Because more expensive, there is not at present on the market a corresponding variety of standard boards having an interface for connection to the PSB bus.

Therefore, it is desirable to have instruments which enable combining the two worlds, that is to use control boards having VME interface in a multiprocessor environment where the PSB bus is used.

To meet this need, it has been proposed to design system architectures where both kind of busses are present and connected together through complex equipments or "gateways", an example of which is described in the European Patent Application EP-A-0260392, of Feb. 23, 1988.

The function of these "gateways" is to adapt the communication protocol used in the VME bus to the one used in the PSB bus and vice versa, so as to enable information exchange between the two busses.

From the architectural standpoint the use of gateways implies the design of systems comprising two distinct structural blocks: a VME environment connected to a VME bus and a PSB environment, connected to a PSB bus.

The two blocks communicate each with the other through one or more intercommunication boards which constitute the gateway.

This arrangement is rigid: the mechanical and electrical implementation of the systems requires the implementation of the two busses on one or two "backpanels" to which several printed circuit boards are connected through connectors.

If the system is designed to connect a maximum number M of boards to the VME bus and a maximum number N of PSB boards to the PSB bus for a total of M+N boards, it is impossible to configure systems where more than M VME boards are present, or more than N PSB boards.

In addition the gateway mechanism is a cause of performance degradation, because a double arbitration is required for access to the bus.

The two arbitrations cannot be time overlapped.

For example, the processors connected to the VME bus must first obtain access to the VME bus with an arbitration operation. Once obtained, they must obtain access to the PSB bus through the gateway, with a second arbitration. Conflicts may occur, which may be solved by retry procedure only, in case access is requested from VME bus to the PSB bus and at the same time access is requested from PSB bus to the VME bus.

SUMMARY OF THE INVENTION

The present invention overcomes these disadvantages and provides an adapter interface from VME bus to PSB bus which enables the use of boards having a VME bus interface in environment foreseen to operate with the PSB bus, without architectural changes or need of gateways.

Reconsidering the example already made it is possible to implement a system where there is only a PSB system bus with connectors for M+N boards.

The boards may all have PSB interface (PSB boards) or may be wholly or partially boards with VME interface. In this case, they are provided with the interface adapter of the invention.

From a constructive standpoint, the interface adapter is a printed circuit board which is connected to a VME board at one edge and at the opposite edge of a PSB bus connector.

Even from this point of view, the interface adapter of the invention provides significant advantages: VME boards are defined by the standard as having a depth perpendicular to the connector insertion disertion on the VME equal to 160 mm and a height equal to 233.35 mm.

PSB boards are defined by the standard as having a depth in direction perpendicular to the connector insertion direction on the PSB bus equal to 211.74 mm and an height equal to 233.35 mm (identical to the one of VME boards).

The adapter of the invention is therefore a printed circuit board having a depth equal to 211.74−160=51.74 mm, so that the composite board resulting from the coupling of a VME board with an adapter has the same size as a PSB board and may be housed in a rack sized for PSB boards.

The rack pitch is 20.32 mm for both standards and defines the maximum encumbrance or thickness allowed to each printed circuit board and to the components mounted thereon.

The interface adapter of the invention conforms to this requirement too.

In this way a VME bus with the related interface adapter is physically compatible with a PSB board and in a system designed to use PSB boards it is possible to replace PSB boards with VME boards provided with the related adapter.

The features and the advantages of the invention will appear more clearly from the following description of a preferred form of embodiment and from the enclosed drawings where:

DESCRIPTION OF THE PREFERRED EMBODIMENT

Figure 1:
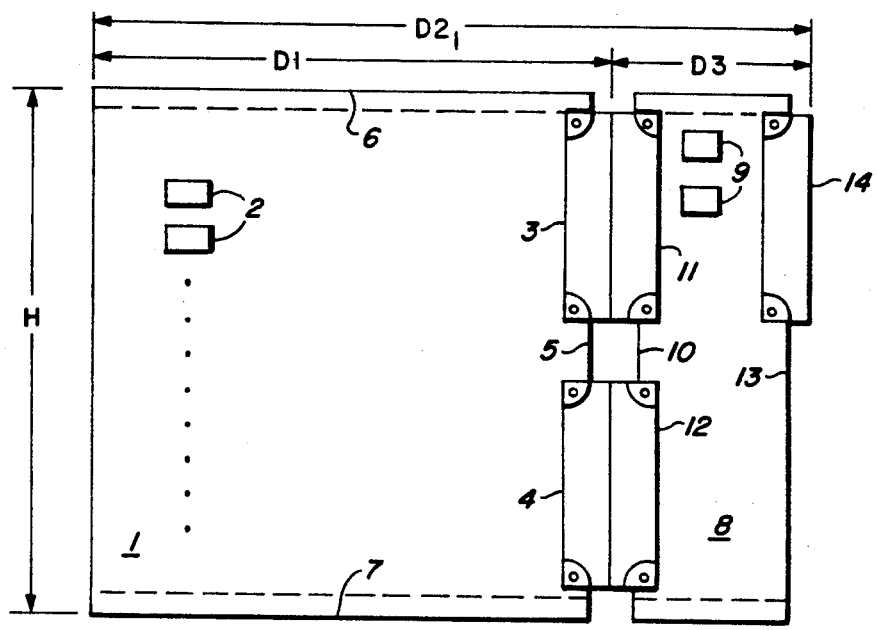
FIG. 1 shows in side view the form of a VME board connected to the interface adapter of the invention.

FIG. 1 is a side view of a VME board connected to the interface adapter of the invention.

The VME board comprises a printed circuit board 1 having the preestablished size and an height H=233.35 mm.

Suitable electronic components 2 are mounted on the board 1. One or two connectors 3,4 are mounted on a vertical edge 5 of the board.

The width or depth of the board, comprising the encumbrance of the connector is D1=160 mm.

The upper and lower edges 6, 7 respectively, are component free so as to permit their insertion in guiding grooves of a rack housing.

The adapter of the invention consists of a printed circuit board 8, having a predetermined size. It too has a height H=233.35 mm and supports a suitable number of electronic components 9.

A vertical edge 10 of the board 8 bears two connectors 11, 12 for connection respectively with connectors 3, 4 of the VME board.

A connector 14 is mounted on the other vertical edge 13 of the board 8, for connection to a corresponding connector mounted on a panel having conductors which form a system standard bus, in particular the PSB bus.

The width or depth D3 of the adapter board 8, including the encumbrance of connectors 11, 12 on one side and connector 14 on the other, is 51.74 mm.

In this way, the whole encumbrance in width of the two boards 1 and 8, coupled together is 211.74 mm corresponding to the width of a standard PSB board.

The component 9, mounted on board 8 performs the required protocol conversion function, for converting the signals received from connectors 11, 12 into signals to input, through connector 14, to the PSB bus and for converting the signals received from connector 14 into signals input to the VME board, through connectors 11, 12.

For better understanding the operation of the adapter, it is useful to recall some essential information related to the two busses. VME bus: comprises 32 leads (VMEDBUS) for bidirectional transfer of data, 32 leads (VME ADDR) for transferring addresses and a suitable number of control leads for the transfer of control signals.

Among such signals the following are mentioned: VMEREQI, VMEGRANTi, BSY, VMEINTi, INTACK, VMER/W, AS, DS, DTACK, ADDRMOD.

In summary, it will be noted that VMEREQi is a plurality of signals, each one used by a differing entity, to request access to the bus.

VMERGRANTi is a set of signals, each one of them being forwarded by an arbitration unit to a different requesting entity.

VMEINTi is a plurality of signals jointly used by several different entities to signal an interrupt to one or more interrupt management units. VMEINTi references the interrupt handling unit but not the requesting unit. A hierarchical interrupt level corresponds to each of the signals VMEINTi.

The VME bus enables communication between an entity acting as a "master" and an entity acting as a "slave".

An entity which wants to become master and send information to one slave must, first of all, obtain access to the bus by asynchronous assertion of its own VMEREQi signal.

An arbitration unit resolves access conflicts and answers by asynchronously asserting the signal VMERGRANTi if, or as soon as, the system bus is free, as indicated by signal BSY deasserted.

On receipt of VMERGRANTi, the requesting entity becomes master and gets control over the bus by asserting the signal BSY. As long as BSY is asserted, no other entity may get access to the system bus. Once BSY is asserted, the master may place an address on the address bus.

The address, validated by assertion of a strobe signal AS, is qualified in its format by a code present on control leads ADDRMOD. The address references a destination unit or "slave".

If the requested operation is a write (VMER/W asserted) the data to be written is input on data channel VMEDBUS and validated by assertion of a plurality of strobe signals DS which qualify their width and arrangement on the bus.

The address present in the bus is monitored by the several units and one among them identifies itself as destination unit and asserts DTACK, as confirmation that the data has been received through the bus (write case), or as indication that the requested data has been put on the bus and is available (read case).

On receipt of DTACK asserted, the masters remove the data and address present on the bus and deasserts AS and DS.

On receipt of DS deasserted, the slave deasserts DTACK and removes the data from the bus (read case).

BSY may be deasserted both during the transfer both thereafter and may be used, the same way as AS, to lock the bus and prevent access by other entities.

The performed dialogue is of asynchronous interlocked type.

A signal VMEINTi may be asserted by any entity even if the bus is busy (BSY asserted).

The interrupt handling unit may respond to the interrupt request only after having obtained control over the bus (signal exchange VMEREQi-VMEGRANTi and assertion of BSY).

Then, by assertion of INTACK, accompanied by a code on a subset of the address leads VMEADD, it may identify the interrupt level to which the response is addressed and request the reading of a status byte in the interrupting unit, which acts as a slave.

The status byte may be considered as an interrupt vector.

It is a duty of the interrupting unit to recognize itself as destination of the interrupt acknowledge signal, by means of "daisy chaining" mechanisms of the signal, VMEINTi and INTACK, for a description of which reference is made to the VME bus specifications.

PSB bus: comprises 32 leads DABUS for transferring addresses and data at different times and a suitable number of arbitration signals/leads BREQ, ARBi and control signals/leads SC0, ... SC9. The dialogue over the bus is synchronous and clocked by a clock signal CK.

An acting entity or agent must first perform an arbitration operation which includes an arbitration phase and an acquisition phase.

The arbitration begins with the assertion of signal BREQ accompanied by an arbitration code ARBI. The assertion of BREQ can be made only if this signal is previously deasserted and no other arbitration is in course.

By monitoring of the code present on the arbitration leads (which is the OR of all codes possibly issued by several entities) an agent may detect that it has higher priority.

Therefore, the acquisition phase may be started by the agent having priority with the assertion of SC0 and deassertion of the arbitration signals.

With the acquisition phase, an information transfer operation begins which comprises a request phase and a reply phase.

During the request phase (SC0 asserted), an address is put on channel ADBUS accompanied by control signals SC4, SC5 which, depending on their state, define a destination space (memory, I/O, messages, interconnect space) and by a control signal SC6, which depending on its state, indicates a read or write operations.

Based on these signals, the destination entity recognizes itself as destination unit.

During the subsequent phase (reply phase) the agent puts the data to be transferred (in case of a write) on the channel ADBUS and asserts SC3 to inform that it is ready to send or to receive data.

If the data transfer in course is the last one, signal SC2 is asserted, in addition to SC3.

During the same phase, the replying entity or replier, asserts SC4 to indicate that it is ready to receive or to send data and in case of read operation it further puts the requested data on the system bus.

During the request phase, the agent may assert SC1 to hold control over the bus for an unlimited number of transfer operations.

Control is held for the whole time during which SC1 is asserted. The PSB protocol does not foresee the possibility of sending interrupt signals. Interrupts are replaced by a transfer operation which reference a message space as destination space.

In these transfer operations, the address put on the bus during the request phase has a particular 2-byte format. One of the bytes identifies the agent (the entity which sends the message). The other byte identifies the replier (destination entity).

The data sent by the agent during the reply phase constitutes an interrupt vector.

The transfer operations which have an interconnect space as destination are used to load registers, assign identification tags and broadly for system configuration operations.

Figure 2:
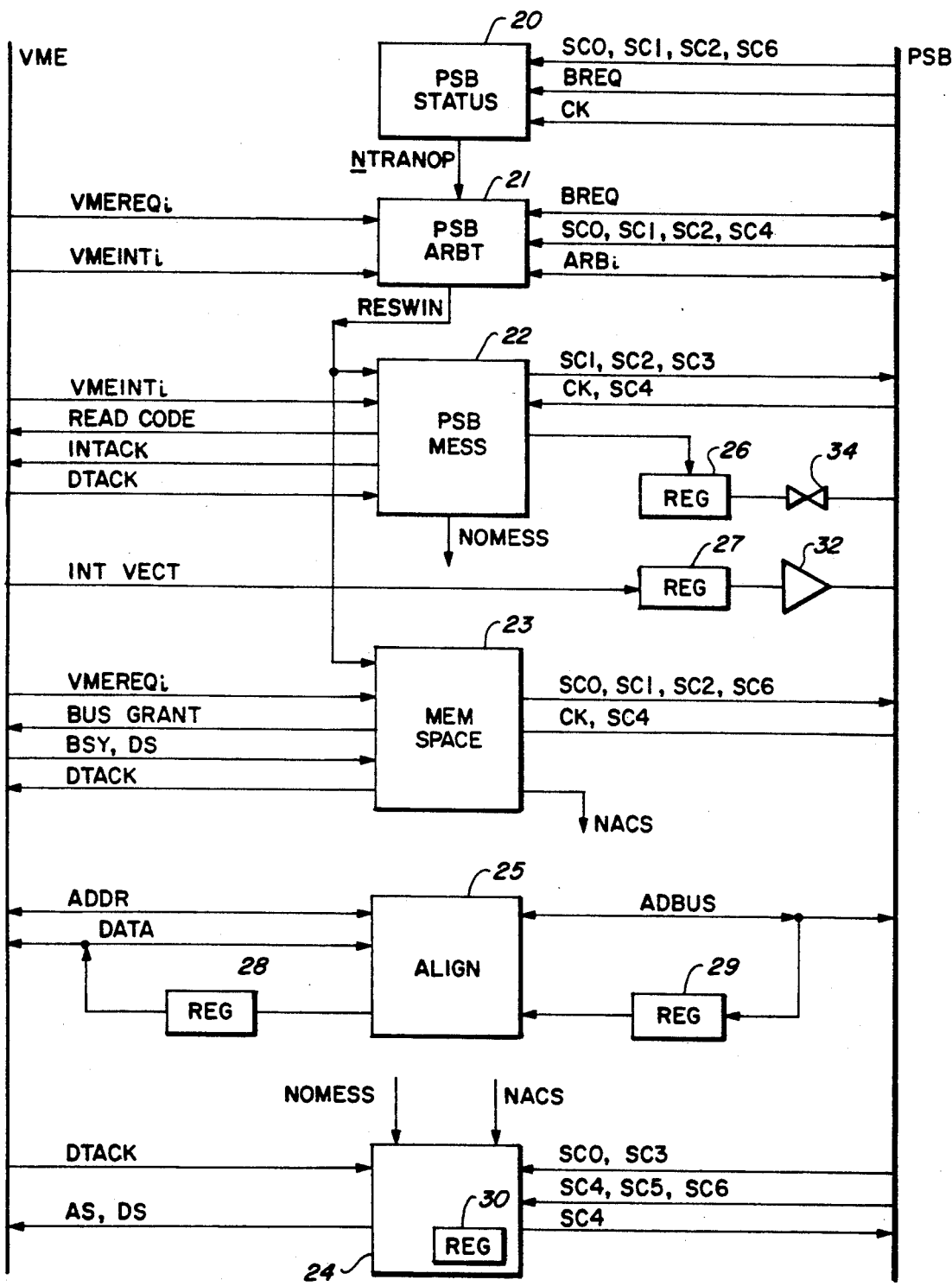
FIG. 2 shows in block diagram the protocol conversion circuits which form the adapter of FIG. 1.

After these summary preliminary remarks the logical organization of the adaptor, shown in block diagram in FIG. 2, may be considered. The adapter comprises a logical block 20 (PSB STATUS) watching the PSB bus status and identifying arbitration or transfer operations in progress.

This block is essential because the function of semaphore in the interprocessor communication is assigned to the PSB bus, while the VME interface between VME board and adapter does not require arbitration. The adapter comprises further a block 21 (PSBARBT) arbitrating access to the PSB, a block 22 (PSB MESS) for converting interrupts present at the VME interface in messages transferred over the PSB bus, a block 23 (MEM SPACE) for converting an access operation from VME interface in a transfer operation over the PSB where the memory space is the destination space, a block 24 for access to VME interface from PSB bus and a block 25 for alignment of transferred data.

The block 20 receives the control signals SC0, SC1, SC2, SC4 and signals CK, BREQ from the PSB bus.

These signals have the meaning and function already explained.

Block 20 is preferably implemented as a set of finite state machines, which are integrated together with several portions of the other blocks, in a single integrated circuit chip.

Figure 3:
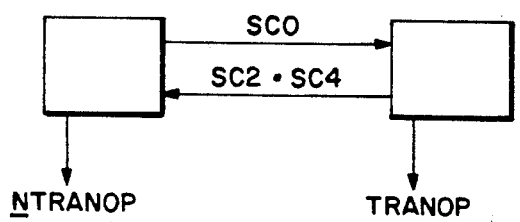
FIG. 3 is a state diagram of the circuitry of block 20 in FIG. 2.
Figure 4:
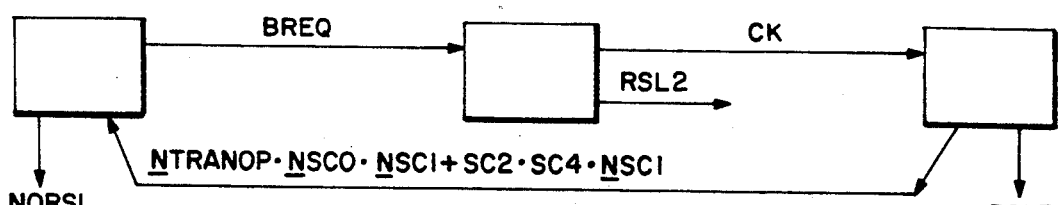
FIG. 4 is a state diagram succeeding that of FIG. 3 when the BREQ signal is asserted on the PSB bus.

These machines, whose operation is shown by state diagrams of FIGS. 3 and 4, generate, depending on the state they have, the following signals (deasserted if preceded by letter N): TRANOP: (FIG. 3 diagram) this signal originates with the detection of SC0 asserted, hence with the detection of a request phase on PSB bus and is self sustaining until as an end of transfer is detected of the PSB bus (signals SC2, SC4 asserted), in which case it is deasserted.

RSL2 (FIG. 4 diagram): this signal originates with the assertion of BREQ on PSB bus and is deasserted on receipt of the next following CK signal. RSL3 (FIG. 4): this signal originates with the first received CK signal, if signal/status RSL2 is present and is deasserted when signal NTRANOP (jointly with SC0, SC1 deasserted is detected, or when a transfer operation over PSB bus is ended (SC1, SC4 asserted) with SC1 deasserted.

The arbitration block 21 is essential because, as already indicated, the arbitration procedures used in the VME bus and in the PSB bus are entirely different, as are the interrupt mechanisms.

Block 21 has the task of arbitrating and obtaining access to the PSB bus not only on the occurrence of a bus access request from VME interface, but also on the occurrence of an interrupt signal VMEINTi, to convert the interrupt to a transfer operation on the PSB bus where the destination is a message space.

Thus, block 21 receives the access request signals VMEREOi and the interrupt signals VMENTi from the VME interface.

It further receives signal BREQ from PSB bus.

Block 21 contains circuits for generation of a priority identification code (present at system initialization) and for comparison of such code with the one present on the PSB bus. Therefore it outputs on and receives signals from leads ARBi.

Figure 5:
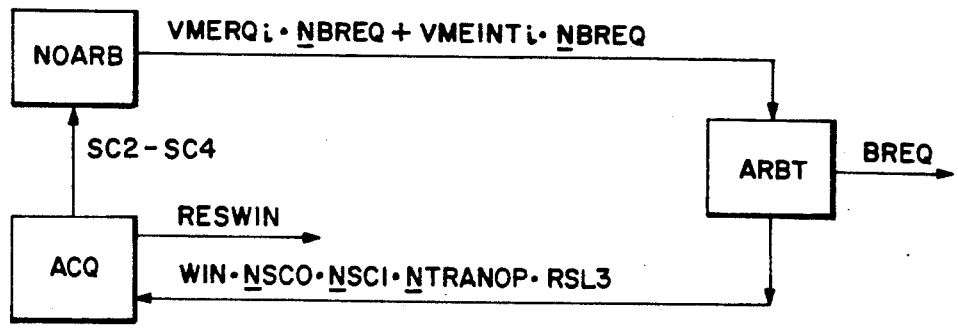
FIG. 5 is a state diagram of block 21.

The states of block 21 are shown by the state diagram of FIG. 5. This machine transits from a no arbitration state NO ARB to an arbitration state ARBT when a request VMEREQi or VMEINTi is received, provided an arbitration phase on PSB bus is not already in course (BREQ deasserted).

When in arbitration state the machine (block 21) asserts signal BREQ on the PSB bus.

From the arbitration state, the machine transits to the acquisition state ACQ (PSB bus acquired) if it detects having priority in the acquisition process (internal signal WIN), if the PSB bus is effectively available (SC0, SC1, TRANOP deasserted) and if the block 20 is in the state in which RSL3 is asserted.

When block 21 transits to acquisition state, the signals BREQ and the arbitration code are deasserted and a signal RESWIN is asserted. Block 21 transits from the acquisition state to the no arbitration state on detection of the end of transfer over the PSB bus (SC2, SC4 asserted).

Block 22 has the function of converting the interrupt signals received from VME interface in messages sent over the PSB bus.

Block 22 receives signals VMEINTi from the VME interface and signal RESWIN from block 21.

Figure 6:
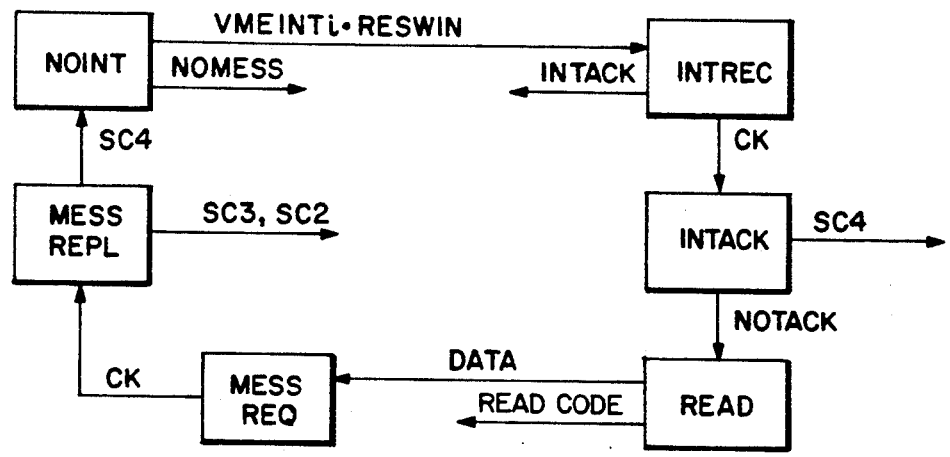
FIG. 6 is a state diagram illustrating the operation of block 21.

The operation of block 22 is explained by the state diagram of FIG. 6.

From a no interrupt state NOINT the block 22 transits to a state of acknowledged interrupt INTREC, owing to the assertion of VMEINTi, if RESWIN is asserted, which is a condition for having access to the PSB bus.

When in this state, block 22 generates a signal INTACK towards the VME interface and loads an output register 26 with a destination code (which is a function of the particular VMENTi signal being asserted) and a code identifying the interrupting processor/adapter.

It further asserts the lock signal SC1 towards the PSB bus, on receipt of a first CK signal, and transits to a state INTACK.

Thereafter, if signal DTACK on VME interface is deasserted, or as soon as DTACK is deasserted, block 22 transits to a read state READ.

When in this state, block 22 forwards to the VME interface a code READ CODE including address and commands for reading and interrupt vector INT VECT (in the VME board) and, on receipt of this information monitored through detection of DTACK asserted and received from the VME interface, loads the vector in an output register 27.

SC1 remains asserted.

On receipt of DTACK asserted, block 22 transits to a state MESS REQ for effectively requesting a message transfer of the PSB bus.

Signal SC0 is asserted and the outputs of register 26 towards PSB bus (gates 31) are enabled. SC1 remains asserted.

On receipt of a first clock signal CK, block 22 transits to a reply state MESS REPL, by asserting signal SC3 on PSB bus in addition to SC2 and by enabling the outputs of register 27 towards PSB bus (gates 32).

On receipt of signal SC4, asserted by the destination processor on PSB bus, block 22 returns in idle state (NOINT). When in this state, a signal NOMESS is generated by block 22.

Block 23 has the function of addressing a memory space through the PSB bus, on request (VMEREQi) from VME interface. Block 23 receives one signal VMEREQi from VME interface and signal RESWIN from block 21.

Figure 7:
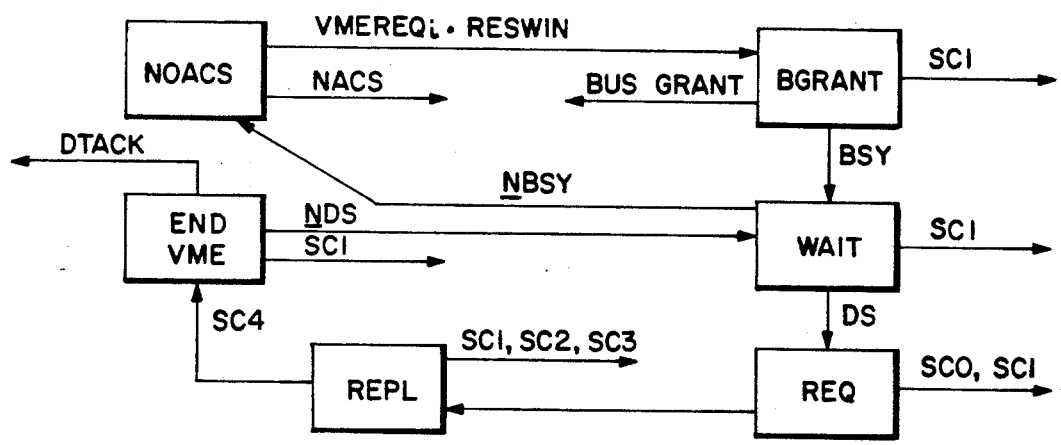
FIG. 7 is a state diagram illustrating the operation of block 22.

The state diagram of FIG. 7 shows the operation of block 23.

Block 23 transits from an inactive state (NOACS) to a state BGRANT, owing to the joint assertion of VMEREQi and RESWIN.

When in this state, block 23 asserts signal SC1 on bus PSB and a signal BUS GRANT towards VME interface.

On receipt of BUS GRANT the VME boards asserts signal BSY on the VME interface.

On receipt of BSY asserted, block 23 transits to a wait state WAIT. Then the VME board puts a memory space address (ADDR) and the related validation signal AS on the interface leads.

It further outputs data to be written in the case of a write operation. This information (ADDR, DATA) is input into an alignment unit 25.

Thereafter, the VME board asserts one or more validation signals DS, which are received by block 23. On receipt of signals DS, block 23 transits from the wait state to a request state REQ and activates a request phase on the PSB bus by asserting SC0, SC1 and other control signals. It further enables alignment unit 25 to transfer the modified (aligned) address on the leads of PSB bus.

Once in state REQ, and on receipt of a first clock signal CK, block 23 transits to a reply state REPL and asserts signals SC1, SC2, SC3 towards PSB bus.

If the started transfer operation is for reading, it loads the received data, previously aligned by alignment unit 25, into a register 28.

If the started transfer operation is for writing, it enables the alignment unit 25 to transfer the data on bus PSB.

On receipt of signal SC4 asserted on PSB bus, the block 23 transits from the reply state to an end of cycle state ENDVME.

When in this state, the block 23 asserts a signal DTACK towards VME interface and enables (if the started operation was a read) the output of register 28 towards the VME interface.

For the VME board, the assertion of DTACK means that the requested read or write operation has been completed. Accordingly it deasserts signals DS.

At this point, the VME board has two alternatives: either freeing the VME interface by deassertion of signal BSY or starting a new transfer operation with a new assertion of signals DS.

Therefore, once DS is deasserted, block 23 does not transit to the idle state NOACS but returns to wait state WAIT. If signals DS are again asserted the cycle is repeated. If signals BSY is deasserted, block 23 returns to the inactive state NOACS.

Block 24 has the function of detecting transfer operations occurring on the PSB bus, which have not been requested by the same adapter owning block 24, so as to transfer the address present on the PSB bus, after format conversion if required, towards the VME interface, so that the VME board may detect itself, by means of its own circuits, as a destination space or not, by assertion of signal DTACK.

Therefore block 24 exchanges signals SC0, SC2, SC3, SC4, SC6 with the PSB bus, signals DTACK, AS, DS with the VME interface and receives the state signals NOMESS and NACS from blocks 22, 23 respectively.

Figure 8:
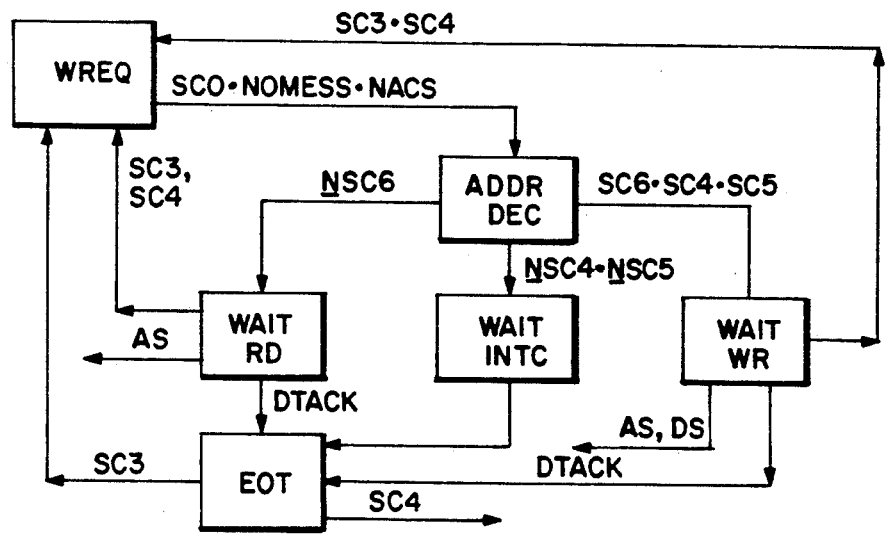
FIG. 8 is a state diagram illustrating the operation of block 23.

The operation of block 24 is shown by the state diagram of FIG. 8. Block 24 transits from a wait state WREQ, waiting for access requests from PSB, to an address decode state ADDR DEC, owing to the joint assertion of SC0, NOMESS and NACS (this last signal indicating that the transfer operation on bus PSB has not been activated by the same adapter).

When this state transition occurs, the address present on the bus PSB is loaded into an input register 29 of the alignment unit 25 and signals SC6 (defining the operation as a read or write), SC2, SC3 are loaded in an internal register 30.

The latched signals SC6, SC2, SC3 are then examined to detect whether the addressed space is an interconnect or memory space and in the second occurrence if the operation is a read or a write one.

If the operation is a write, the data to be written are loaded in register 28 (after alignment if required).

Depending on the performed decoding, block 24 transits from state ADDR DEC to one of three possible wait states: WAIT WR, WAIT INTC, WAIT RD.

They are respectively related to a write operation in memory space, to a write operation of internal registers of the adapter, to a read operation in memory space.

When in state WAIT WR, the block 24 puts the address (latched in register 29) and the data (latched in register 28) on the VME interface, asserts AS and DS towards VME interface and waits for signal DTACK.

If this signal is not received, and meanwhile signals SC3, SC4 on PSB bus are asserted, this means that the write operation was related to a memory space owned by a processor (VME board) other than the one coupled to the adapter. Therefore, the block 24 transits to the rest state WREQ.

On the contrary, if signal DTACK is asserted on the VME interface, this means that the write operation has been performed by the VME board coupled to the adapter and the dialog on PSB bus may be concluded. Therefore, block 24 transits to an end of transfer state EOT, which will be considered later.

When in state WAIT INTC, block 24 selects one of the adapter registers (for instance register 26) and writes therein the data present on the PSB bus, then transiting to the state EOT.

When in state WAIT RD, block 24 transfers on the VME interface the address latched in register 29, the read command SC6 (latched in register 30), asserts AS and waits for assertion of DTACK.

Like the case of write operation, block 24 transits from state WAIT RD to state WREQ if assertion of SC3, SC4 on bus PSB is detected (addressed memory space owned by another VME processor) or to state EOT on receipt of DTACK from VME interface.

When the block 24 is in state EOT, it asserts SC4 towards PSB bus and enables block 25 to transfer the latched data to the PSB bus, in case of read operation, deasserting AS and DS towards VME interface. Eventually, block 24 transits from state EOT to state WREQ on detection of SC3 on PSB bus.

What is claimed is:

1. An interface adapter having a VME bus interface and a MULTIBUS II interface for interconnecting an electronic unit having said VME bus interface with a MULTIBUS II system bus, through said VME bus interface and said MULTIBUS II interface, respectively; said interface adapter including a circuit board comprising logic circuits for converting interface signals conforming to a protocol of said VME bus interface into interface signals conforming to a protocol of said MULTIBUS II interface and vice versa, said logic circuits comprising:

first logic means having one of an active state and an inactive state, said first logic means, when in said active state, requesting and obtaining access to said system bus for said electronic unit and when in said inactive state, asserting a signal of no access to said system bus; and second logic means, connected to said first logic means, receiving said no access signal from said first logic means and control signals from said system bus for monitoring accesses to said system bus and discriminating said accesses between ones of said accesses which have been requested by said first logic means and ones of said accesses which have not been requested by said first logic means; said second logic means, upon detection of any one of said accesses not requested by said first logic means, transferring to said VME bus interface operation requests received at said MULTIBUS II interface, concurrently with said detected access; said second logic means, upon receipt of a first response signal at said VME interface from said electronic unit in response to said operation requests, generating a second response signal and asserting said second response signal on said system bus, said second response signal being one of said converted interface signals; and said second logic means monitoring said system bus for an end of transfer signal and, upon detection of said end of transfer signal asserted on said system bus, resuming a wait monitoring state.

2. An interface adapter as in claim 1 where said circuit board has first connection means on a first edge of said circuit board, for connection to said electronic unit and second connection means, on a second edge opposite to said first edge, for connection to said system bus, said circuit board having a size such that when coupled to said electronic unit, said electronic unit conforming to VME size standards, the pair of said coupled boards has a size conforming to the MULTIBUS II size standard, whereby said pair can be inserted in a housing sized to contain a standard MULTIBUS II board.

* * * * *